(12) United States Patent
Chang et al.

(10) Patent No.: US 8,228,598 B2
(45) Date of Patent: Jul. 24, 2012

(54) OPTICAL AMPLIFIER WITH RAMAN AND RARE-EARTH-DOPED FIBER AMPLIFIER BOTH PUMPED EFFICIENTLY USING DIRECT AND REFLECTED PUMP LIGHT

(75) Inventors: Do-Il Chang, Allen, TX (US); Wayne S. Pelouch, McKinney, TX (US); Herve A. Fevrier, Plano, TX (US)

(73) Assignee: Xtera Communications, Inc., Allen, TX (US)

(*) Notice: Subject to any disclaimer, the term of this patent is extended or adjusted under 35 U.S.C. 154(b) by 599 days.

(21) Appl. No.: 12/350,070

(22) Filed: Jan. 7, 2009

(65) Prior Publication Data

US 2009/0174933 A1    Jul. 9, 2009

Related U.S. Application Data

(60) Provisional application No. 61/019,574, filed on Jan. 7, 2008, provisional application No. 61/019,577, filed on Jan. 7, 2008, provisional application No. 61/019,467, filed on Jan. 7, 2008.

(51) Int. Cl.
  *H04B 10/17* (2006.01)
  *H01S 3/30* (2006.01)
  *H04B 10/12* (2006.01)
(52) U.S. Cl. ........... 359/341.32; 359/334; 359/341.3
(58) Field of Classification Search ........... 359/334, 359/341.3, 341.32
  See application file for complete search history.

(56) References Cited

U.S. PATENT DOCUMENTS

| | | | |
|---|---|---|---|
| 5,710,659 A | 1/1998 | Cline | |
| 6,359,728 B1 | 3/2002 | Angellieri et al. | |
| 6,417,961 B1 * | 7/2002 | Sun et al. | 359/337.5 |
| 6,456,426 B1 | 9/2002 | Bolshtyansky et al. | |
| 6,462,862 B2 * | 10/2002 | Kinoshita | 359/334 |
| 6,504,973 B1 * | 1/2003 | DiGiovanni et al. | 385/27 |
| 6,888,670 B2 * | 5/2005 | Oh et al. | 359/334 |
| 2002/0008901 A1 * | 1/2002 | Kinoshita | 359/341.1 |
| 2003/0035202 A1 | 2/2003 | Islam et al. | |
| 2003/0053192 A1 | 3/2003 | Islam et al. | |
| 2003/0053507 A1 | 3/2003 | Islam et al. | |
| 2003/0117692 A1 * | 6/2003 | Tanaka et al. | 359/334 |
| 2003/0179440 A1 * | 9/2003 | Foursa et al. | 359/334 |
| 2004/0091003 A1 | 5/2004 | Ogiwara et al. | |

FOREIGN PATENT DOCUMENTS

JP    09185090 A  *  7/1997

OTHER PUBLICATIONS

PCT/US2009/030358, Notification of Transmittal of the International Search Report and the Written Opinion of the International Searching Authority, or Declaration dated Feb. 23, 2009. (9 pages).

* cited by examiner

*Primary Examiner* — Eric Bolda
(74) *Attorney, Agent, or Firm* — James Harlan (57) ABSTRACT

An optical amplification mechanism that introduces optical pump(s) into one port of an optical circulator. The optical circulator directs the optical pumps from that port into another port that is coupled to the output of a gain stage. The optical pump(s) then pass from the output to the input of the gain stage while amplifying an optical signal passing from the input to the output of the gain stage. A residual amount of optical pump(s) that exits the input of the gain stage is reflected back into the input of the gain stage. The reflected optical pump(s) then further assists in the amplification of the optical signal. Other embodiments are also disclosed.

17 Claims, 9 Drawing Sheets

| CASE | Gain Fiber (Include DCU) | | Operations On 80Km (21dB), 60CHs | | | | |
|---|---|---|---|---|---|---|---|
| | Type | Total Length (Km) | NF (dB) | MPI (dB) | Total Pump Power (mW) | Residual Pump Power Terminated (mW) | Pump Usage Efficiency (%) |
| FIGURE 2A | LLMicroDK | 7.80 | 26.9 | -40.5 | 520 | 12 | 98 |
| FIGURE 3A | LLMicroDK | 7.80 | 26.6 | -32.6 | 580 | 19 | 97 |
| FIGURE 4A | LLMicroDK | 7.80 | 26.6 | -31.8 | 603 | 18 | 97 |
| FIGURE 5 | LLMicroDK | 7.80 | 27.3 | -36.6 | 1130 | 409 | 64 |

FIG. 6

OPTICAL AMPLIFIER WITH RAMAN AND RARE-EARTH-DOPED FIBER AMPLIFIER BOTH PUMPED EFFICIENTLY USING DIRECT AND REFLECTED PUMP LIGHT

CROSS-REFERENCE TO RELATED APPLICATIONS

This application claims benefit under 35 U.S.C. §119(e) of U.S. Provisional Application Ser. No. 61/019,574, entitled "EFFICIENT DISCRETE AMPLIFICATION", filed Jan. 7, 2008, by DO-IL Chang et al. This application also claims benefit under 35 U.S.C. §119(e) of U.S. Provisional Application Ser. No. 61/019,577, entitled "SYSTEM AND METHOD FOR EXPANDING THE BANDWIDTH OF AN OPTICAL AMPLIFIER", filed Jan. 7, 2008, by DO-IL Chang et al. This application also claims benefit under 35 U.S.C. §119(e) of U.S. Provisional Application Ser. No. 61/019,467, entitled "OPTICAL AMPLIFIER CAPABLE OF AMPLIFYING OPTICAL SIGNALS THAT TRAVERSE SEPARATE TRANSMISSION FIBERS", filed Jan. 7, 2008, by Wayne S. Pelouch et al.

BACKGROUND

In-line or discrete optical amplifiers used in optical communication networks are capable of amplifying wavelength channels as those channels traverse the communication network. Conventional discrete optical amplifiers have typically been limited in how efficiently they use the pump power provided to the gain medium because of their inherent performance characteristics. In other words, pump sources typically provided a relatively high power pump signal ("pump") to the gain medium and the limitations associated with the characteristics of the optical amplifier prevented it from using all or a substantial portion of the pump power. Consequently, conventional discrete optical amplifiers dump a significant amount of the residual power from the pump.

BRIEF SUMMARY

Embodiments described herein relate to optical amplification using a gain stage.

In one embodiment, an optical pump source introduces optical pump(s) into one port of an optical circulator. The optical circulator directs the optical pumps from that port into another port that is coupled to the output of a gain stage. The optical pump(s) then pass from the output to the input of the gain stage while amplifying an optical signal passing from the input to the output of the gain stage. A residual amount of optical pump(s) that exits the input of the gain stage is reflected back into the input of the gain stage. The reflected optical pump(s) then further assists in the amplification of the optical signal as the optical pump(s) travels from the input to the output of the gain stage.

In another embodiment, optical pump(s) are emitted into the output of a first gain stage so that the optical pump(s) propagates from the output to the input of the first gain stage while amplifying an optical signal travelling from the input to the output of the first gain stage. An optical element (such as a pump bypass filter) allows the optical signal to transmit from the input port of the optical element to the output port of the optical element and into the input of the first gain stage. The optical element also isolates the input port of the optical element from optical signals present at the output port of the optical element. However, the optical element allows the optical pump(s) to be communicated from the output port to the input port and into the output of a second gain stage. While the optical pump(s) pass from the output of the second gain stage to the input of the second gain stage, the optical pump(s) assist in the amplification of optical signals propagating from the input to the output of the second gain stage. The optical pumps exiting the input of the second gain stage are then reflected back into the second gain stage to further assist in amplification of the optical signal.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Particular examples and values (such as dimensions and wavelengths) specified throughout this document are for illustrative purposes only, and are not intended to limit the scope of the present disclosure. In particular, this disclosure is not limited to any particular type of optical communication system. The teachings of the present disclosure may be used in any optical communication system where it is desired to efficiently amplify optical signals traversing an optical fiber. Moreover, the illustrations in FIGS. 1 through 6 are not intended to be to scale.

Figure 1:
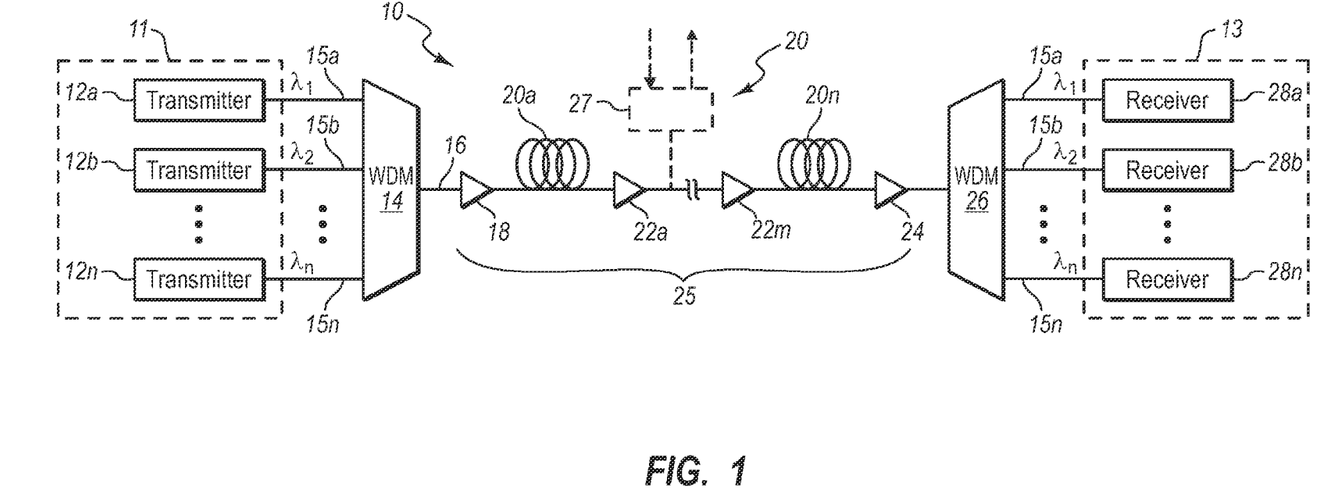
FIG. 1 is a block diagram showing at least a portion of an optical communication system operable to facilitate communication of one or more multiple wavelength signals.

FIG. 1 is a block diagram showing at least a portion of an example optical communication system 10 operable to facilitate communication of one or more multiple wavelength signals 16. In some embodiments, system 10 may comprise the entire optical communication system. In other embodiments, system 10 may comprise a portion of a larger optical communication system.

In this example, system 10 includes a plurality of transmitters 12a-12n operable to generate a plurality of optical signals (or channels) 15a-15n, each comprising a center wavelength of light. In some embodiments, each optical channel 15 comprises a center wavelength that is substantially different from the center wavelengths of other channels 15. As used throughout this document, the term "center wavelength" refers to a time-averaged mean of the spectral distribution of an optical signal. The spectrum surrounding the center wavelength need not be symmetric about the center wavelength. Moreover, there is no requirement that the center wavelength represent a carrier wavelength. Transmitters 12 can comprise any device capable of generating one or more optical channels. Transmitters 12 can comprise externally modulated light sources, or can comprise directly modulated light sources.

In one embodiment, transmitters 12 comprise one or a plurality of independent light sources each having an associated modulator, with each source being operable to generate one or more optical channels 15. Alternatively, transmitters 12 could comprise one or more light sources shared by a plurality of modulators. For example, transmitters 12 could comprise a continuum source transmitter operable to generate a multitude of optical signals. In that embodiment, a signal splitter receives the continuum and separates the continuum into individual channels each having a center wavelength. In some embodiments, transmitters 12 can also include a pulse rate multiplexer, such as a time division multiplexer, operable to multiplex pulses received from a mode locked source or a modulator to increase the bit rate of the system.

Transmitters 12, in some cases, may comprise a portion of an optical regenerator. That is, transmitters 12 may generate optical channels 15 based on electrical representations of electrical or optical channels received from other optical communication links. In other cases, transmitters 12 may generate optical channels 15 based on information received from sources residing locally to transmitters 12. Transmitters 12 could also comprise a portion of a transponder assembly (not explicitly shown), containing a plurality of transmitters and a plurality of receivers.

In various embodiments, transmitters 12 may include a forward error correction (FEC) encoder/decoder module capable improving the Q-factor of channels 15 and the bit-error rate of system 10. For example, the FEC module may encode an FEC sequence, such as, Reed Solomon coding, Turbo Product Codes coding, Concatenated Reed-Solomon coding, or other algorithms capable of improving the Q-factor of channels 15 and the bit error rate of system 10. As used throughout this document, the term "Q-factor" refers to a metric for determining the quality of the signal communicated from a transmitter. The "Q-factor" associated with optical channels 15 communicated from transmitters 12 refers to the difference of the mean value of the high signal values ($M_H$) and the mean value of the low signal values ($M_L$) associated with an optical signal over the sum of the standard deviation of the multiple highs ($\Delta_H$) and the multiple lows ($\Delta_L$). The value of the Q-factor can be expressed in $dB_{20}$. In equation form, this relationship is expressed as:

$$Q=[M_H-M_L]\div[\Delta_H+\Delta_L]$$

In some cases, multiple wavelength signals 16 can carry wavelength signals 15a-15n ranging across a relatively wide bandwidth. In some implementations, wavelength signals 15a-15n may even range across different communications bands (e.g., the short band (S-band), the conventional band (C-band), and/or the long band (L-band)).

In the illustrated embodiment, system 10 also includes combiners 14 operable to receive optical channels 15a-15n, and to combine those signals into multiple wavelength channels 16. As one particular example, combiners 14 could comprise a wavelength division multiplexer (WDM). The terms wavelength division multiplexer and wavelength division demultiplexer as used herein may include equipment operable to process wavelength division multiplexed signals and/or equipment operable to process dense wavelength division multiplexed signals.

System 10 communicates multiple wavelength signal 16 over optical communication spans 20a-20n. Communication span 20 can comprise, for example, standard single mode fiber (SMF), dispersion shifted fiber (DSF), non-zero dispersion shifted fiber (NZDSF), dispersion compensating fiber (DCF), pure-silica core fiber (PSCF), or another fiber type or combination of fiber types. In various embodiments, span 20a-20n can comprise any span length. In some embodiments, communication span 20 could comprise, for example, a unidirectional span or a bidirectional span. Span 20 could comprise a point-to-point communication link, or could comprise a portion of a larger communication network, such as a ring network, a mesh network, a star network, or any other network configuration. For example, communication span 20 could comprise one span or link of a multiple link system, where each link couples to other links through, for example, optical regenerators or wavelength selective switches. A link refers to a group of one or more spans with optical communication between two points through the spans.

One or more spans of communication medium 20 can collectively form an optical link. In the illustrated example, communication media 20 includes a single optical link 25, respectively, comprising numerous spans 20a-20n. System 10 could include any number of additional links coupled to links 25. For example, optical link 25 could comprise one optical link of a multiple link system, where each link is coupled to other links through, for example, optical regenerators or wavelength selective switches.

Optical link 25 could comprise point-to-point communication links, or could comprise a portion of a larger communication network, such as a ring network, a mesh network, a star network, or any other network configuration.

System 10 may further include one or more access elements 27. For example, access elements 27 could comprise an add/drop multiplexer, a cross connect, or another device operable to terminate, cross connect, switch, route, process, and/or provide access to and from optical link 25 and another optical link or communication device. System 10 may also include one or more lossy elements (not explicitly shown) and/or gain elements capable of at least partially compensating for the lossy element coupled between spans 20 of link 25. For example, the lossy element could comprise a signal separator, a signal combiner, an isolator, a dispersion compensating element, a circulator, or a gain equalizer.

In this embodiment, separator 26 separates individual optical signals 15a-15n from multiple wavelength signals 16 received at the end of link 25. Separator 26 may comprise, for example, a wavelength division demultiplexer (WDM). Separator 26 communicates individual signal wavelengths or ranges of wavelengths to a bank of receivers 28 and/or other optical communication paths. One or more of receivers 28 may comprise a portion of an optical transceiver operable to receive and convert signals between optical and electrical formats.

In the illustrated embodiment, transmitters 12 and receivers 28 reside within terminals 11 and 13, respectively. Terminals 11 and 13 can include both transmitters and receivers without departing from the scope of the present disclosure. Additionally, terminals 11 and 13 may include any other optical component, such as, combiner 14, booster amplifier 18, pre-amplifier 24, and/or separator 26 without departing from the scope of the present disclosure. In some cases, terminals 11 and 13 can be referred to as end terminals. The phrase "end terminal" refers to devices operable to perform optical-to-electrical and/or electrical-to-optical signal conversion and/or generation.

System 10 includes a plurality of optical amplifiers coupled to communication span 20. In this example, system 10 includes booster amplifier 18 operable to receive and amplify wavelengths of signals 16 in preparation for transmission over communication span 20. Where communication system 10 includes a plurality of fiber spans 20a-20n, system 10 can also include one or more in line amplifiers 22a-22m with or without co-propagating and/or counter-propagating (relative to the signal direction) distributed Raman amplification. In line amplifiers 22 couple to one or more spans 20a-20n and operate to amplify signals 16 as they traverse communication span 20. The illustrated example also implements a preamplifier 24 operable to amplify signals 16b received from final fiber span 20n prior to communicating signals 16 to separator 26. Although optical link 25 is shown to include one or more booster amplifiers 18 and preamplifiers 24, one or more of the amplifier types could be eliminated in other embodiments.

Amplifiers 18, 22, and 24 could each comprise, for example, one or more stages of discrete Raman amplification stages, distributed Raman amplification stages, rare earth doped amplification stages, such as erbium doped or thulium doped stages, semiconductor amplification stages or a combination of these or other amplification stage types. Throughout this document, the term "amplifier" denotes a device or combination of devices operable to at least partially compensate for at least some of the losses incurred by signals while traversing all or a portion of optical link 25. Likewise, the terms "amplify" and "amplification" refers to offsetting at least a portion of losses that would otherwise be incurred.

An amplifier may, or may not impart a net gain to a signal being amplified. Moreover, the terms "gain" and "amplify" as used throughout this document do not (unless explicitly specified) require a net gain. In other words, it is not necessary that a signal experiencing "gain" or "amplification" in an amplifier stage experience enough gain to overcome all losses in the amplifier stage or in the fiber connected to the amplifier stage. As a specific example, distributed Raman amplifier stages often do not experience enough gain to offset all of the losses in the transmission fiber that serves as a gain medium. Nevertheless, these devices are considered "amplifiers" because they offset at least a portion of the losses experienced in the transmission fiber.

Depending on the amplifier types chosen, one or more of amplifiers 18, 22, and/or 24 could comprise a wide band amplifier operable to amplify all signal wavelengths 15a-15n received. Alternatively, one or more of those amplifiers could comprise a parallel combination of narrower band amplifier assemblies, wherein each amplifier in the parallel combination is operable to amplify a portion of the wavelengths of multiple wavelength signals 16. In that case, system 10 could incorporate signal separators and/or signal combiners surrounding the parallel combinations of amplifier assemblies to facilitate amplification of a plurality of groups of wavelengths for separating and/or combining or recombining the wavelengths for communication through system 10.

In this or other embodiments, system 10 may implement one or more dispersion management techniques to compensate for dispersion of signals 16. For example, system 10 can implement a pre-compensation, in-line compensation, and/or a post-compensation technique. These dispersion compensation techniques can include, for example, electronic dispersion compensation techniques, optical dispersion compensation techniques, or any other appropriate dispersion compensation technique. In various embodiments, terminals 11 and 13 can include one or more dispersion compensating elements capable of at least partially compensating for chromatic dispersion associated with signals 16. In some embodiments, the dispersion compensating element can comprise a dispersion length product that approximately compensates for the dispersion accumulated by optical signals 16 while traversing span 20 of system 10. In other embodiments, at least a portion of a gain medium of amplifier 24 may comprise a dispersion compensating fiber that is capable of at least partially compensating for chromatic dispersion associated with signals 16. In those embodiments, the dispersion compensating fiber can comprise a slope of dispersion that is equal to and opposite from the slope of chromatic dispersion associated with multiple wavelength signals 16 in spans 20.

One or more of amplifiers 18, 22, or 24 can comprise an efficient discrete optical amplifier. An efficient discrete optical amplifier may, in some circumstances, use a substantial portion of available pump power to amplify one or more communication signals. Efficient discrete optical amplifiers may use a much greater percentage of available power than some existing designs, thus wasting less power.

In some embodiments, an efficient discrete optical amplifier may comprise a highly efficient gain fiber and a composite Raman gain medium. A highly efficient gain fiber is defined as having a small-signal gain of greater than 5 dB per 100 mW (0.05 dB/mW) of depolarized pump power which is more than twice the efficiency of Raman amplification in typical dispersion compensation fiber and typical line fiber. The gain fiber may comprise, for example, a rare-earth-doped amplifier. For example, erbium doped fiber typically has an efficiency of greater than 0.5 dB/mW. In some embodiments, the length of rare-earth-doped fiber may be short enough to provide net gain with a relatively low amount of pump power. In some embodiments, Raman amplification can then be used to further amplify the communication signal. One or more Raman gain media may be used to amplify one or more communication signals, with designs that use a substantial portion of the available pump power. Certain embodiments may also lower a noise figure and/or reduce multi-path interference.

Described below are a number of configurations that may be used to create an efficient discrete optical amplifier. In some embodiments, a circulator may be placed between two Raman gain media, which can reduce multi-path interference and increase a lasing threshold. The circulator can replace one or more components of an amplifier, providing not only more efficient use of available pump power but also cost savings. In certain other embodiments, the insertion loss of a dispersion compensation unit, capable of providing Raman amplification, may be lowered by a more efficient use of pump power. In other embodiments, reflectors may be used at either end of a gain medium to increase the efficiency of the amplifier.

Figure 2A:
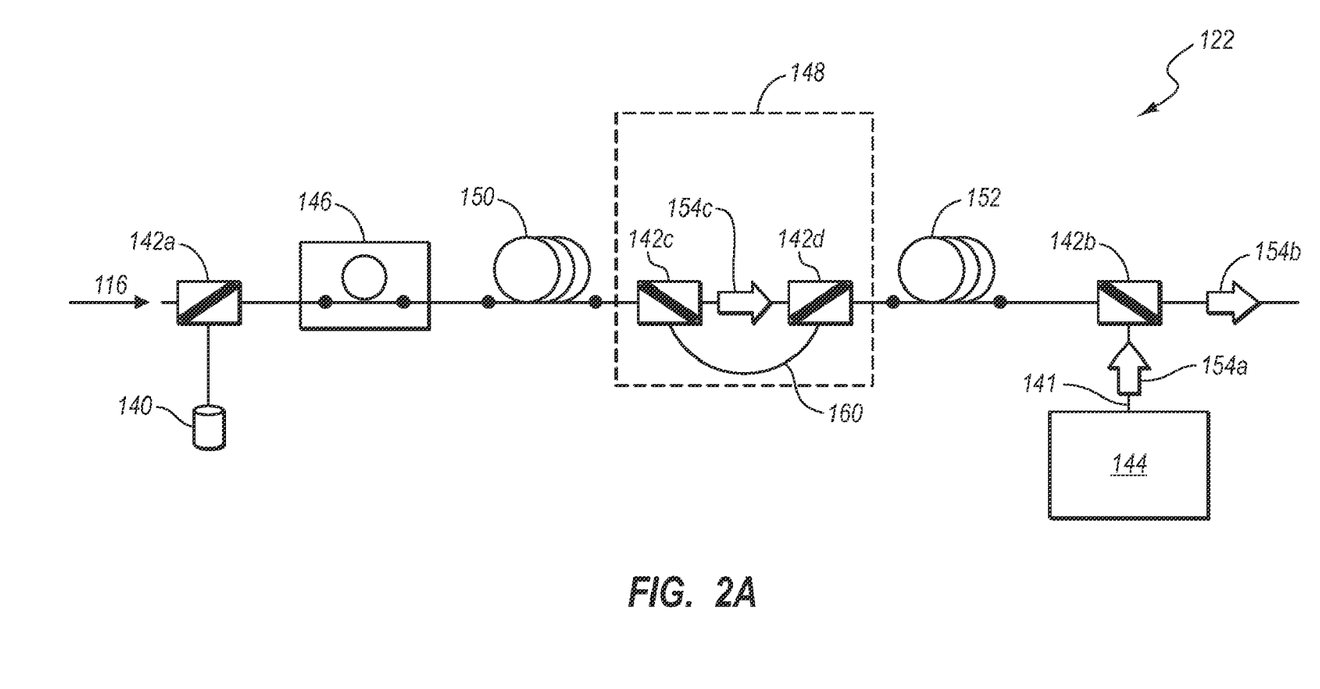
FIGS. 2A-2B are block diagrams of example embodiments of an efficient discrete optical amplifier.

FIG. 2A is a block diagram of one example embodiment of an efficient discrete optical amplifier assembly 122 capable of amplifying optical signals that traverse optical fibers or communication spans. Amplifier assembly 122 may, for example, be useful in system 10 of FIG. 1 as one of amplifiers 18, 22, and/or 24. In this example, amplifier assembly 122 includes a pump source 144 that generates a pump 141 having one or more pump wavelengths. Pump assembly 144 can comprise any device or combination of devices capable of generating one or more pump wavelengths at desired power levels and wavelengths. For example, pump assembly 144 can comprise a solid state laser, such a Nd:YAG or Nd:YLF laser, a semiconductor laser, a laser diode, a cladding pump fiber laser, or any combination of these or other light sources.

Pump 141 can comprise one or more pump wavelengths, each of the one or more pump wavelengths comprising a center wavelength of light. In some embodiments, each of the one or more pump wavelengths within a pump 141 can comprise a center wavelength that is substantially different from the center wavelengths of any other pump wavelengths within particular pump 141. Although one pump source 144 and pump 141 are illustrated in this example, any other number of pump sources and/or pumps can be used without departing from the scope of the present disclosure.

In some embodiments, pump 141 can co-propagate through amplifier assembly 122 in relation to one or more optical signals, such as signal 16 described in FIG. 1. In other embodiments, pump 141 can counter-propagate through amplifier assembly 122 in relation to one or more optical signals. In yet other embodiments, at least a portion of pump 141 can co-propagate through amplifier assembly 122 in relation to one or more optical signals, while another portion of pump 141 can counter-propagate through amplifier assembly 122. As used throughout this document, the term "co-propagates" or "co-propagating" refers to a condition where, for at least some time at least a portion of the pump propagates through the gain medium in the same direction as at least one wavelength of the optical signal being amplified. In addition, the term "counter-propagates" or "counter-propagating" refers to a condition where at least a portion of a pump propagates through a gain medium of an optical device in a direction counter to the direction of the optical signal being amplified.

Amplifier assembly 122 includes one or more couplers 142 capable of coupling and/or decoupling pump 141 to/from optical signal path 116. Couplers 142 can comprise any optical coupler capable of adding or removing pump 141 from optical signal path 116. For example, couplers 142 can comprise a wavelength division multiplexer (WDM) or an optical add/drop multiplexer (OADM). Throughout this disclosure the terms "add/drop," "adding/dropping," and "added/dropped" refer to either the operation of adding one or more wavelength signals, dropping one or more wavelength signals, or adding wavelength signals and dropping others. Those terms are not intended to require both add and drop operation, but are also not intended to exclude add and drop operations. The terms are merely used as a convenient way to refer to either adding or dropping or both adding and dropping operations. Pump couplers 142 can be used to combine one or more pumps and/or signals in amplifier assembly 122.

In this example, amplifier assembly 122 further includes a reflector 140 capable of substantially reflecting pump 141. Reflector 140 may comprise, for example, an optical filter, a mirror, a Bragg grating, or any other optical device capable of substantially reflecting one or more pump wavelengths. In some cases, reflector 140 may allow additional pumps to be coupled into one of the one or more Raman gain mediums 150 and 152. Reflector 140 can be located on either side of Raman gain medium 150 or 152; in certain embodiments, more than one reflector 140 may be used.

In this particular embodiment, amplifier assembly 122 also includes a relatively short length of a rare-earth-doped fiber 146. In some embodiments, the length of rare-earth-doped fiber may be short enough to provide net gain with a relatively low amount of pump power. Rare-earth-doped fiber 146 can comprise, for example, an erbium-doped or thulium-doped amplifier. In this embodiment, fiber 146 may comprise 2.1 meters of erbium-doped fiber (OFS, R37105XL). Although fiber 146 comprises a length of 2.1 meters in this example, any other desired length of fiber can be used without departing from the scope of the present disclosure. In another embodiment, doped fiber 146 may comprise 3.7 meters erbium-doped fiber (OFS, R37003X). Rare-earth-doped fiber 146 can be located on either side of Raman gain medium 150 or 152; in certain embodiments, more than one rare-earth-doped fiber 146 may be used.

Amplifier assembly 122 can also includes a first Raman gain medium 150 and a second Raman gain medium 152. Although this example includes two Raman gain media 150 and 152, any number of gain media can be used without departing from the scope of the present disclosure. In various embodiments, Raman gain medium 150 could comprise 3.8 km OFS low-loss-micro-DK (LLMicroDK) fiber. In another embodiment, Raman gain medium 152 could comprise 4.0 km of LLMicroDK fiber. Raman gain media 150 and 152 may provide Raman amplification to an optical signal traversing a communication fiber.

Amplifier assembly 122 further includes optical isolators 154 that prevent the transmission of optical signals and/or pumps in specific directions. In some cases, isolators 154 may be used to prevent optical signal cross-talk or instabilities through feedback. Optical isolators 154 can comprise any device capable of passing an optical signal in one direction and capable of substantially blocking an optical signal from passing in another direction. Amplifier assembly 122 may comprise additional couplers 142c and 142d to allow pump wavelengths, but not signal wavelengths, to bypass isolator 154c through path 160 and travel in either direction. Component combination 148 is referred to as a "pump bypass filter".

One aspect of this disclosure recognizes that placing optical isolator 154c and couplers 142c, 142d between Raman gain medium 150 and 152 advantageously prevents lasing within the Raman amplification region of amplifier assembly 122 while allowing pump 141 to be directed to second gain fiber 150.

In this particular embodiment, pump 141 comprises a pump power of approximately 167 mw at a wavelength of 1442 nm and a pump power of 353 mW at a wavelength of 1468 nm to support 80 km (loss of 21 dB) standard single mode transmission fiber (SSMF). Pumps 141 first traverses Raman gain medium 152 in a counter-propagating direction and provides Raman gain to optical signal 116. Pumps then traverse path 160, bypassing isolator 154c, and then operate to amplify optical signal 116 in Raman gain medium 150. In this example, pump 141 still has sufficient power after traversing Raman gain medium 152 to amplify optical signal 116 in gain medium 150.

After traversing gain medium 150, pump 141 may contain approximately 15% of its original power. One aspect of this disclosure recognizes that the efficiency of amplifier assembly 122 can be improved by implementing rare-earth doped fiber 146 to amplify optical signal 116 using any residual power remaining in pump 141 after traversing Raman gain media 150 and 152.

In this example, fiber 146 can provide a fixed gain over a particular set of wavelengths. Raman gain media 150 and/or 152 may then provide Raman amplification when pumped with a pump from pump unit 144, which in certain embodiments can be a much larger amplification than provided by rare-earth-doped fiber 146. In certain other embodiments, rare-earth-doped fiber 146 can be connected to pump bypass filter 148, or located on either side of Raman gain medium 152. In certain other embodiments, pump bypass filter 148 may be positioned between fibers 146 and 150. Amplifier assembly 122 further comprises optical isolators 154A and 154B. Pump isolator 154A may be used to prevent pump cross-talk or instabilities through feedback. Signal isolator 154B may be used, in certain embodiments, to isolate the signal in a communication fiber. Amplifier assembly 122 further comprises reflector 140 capable of substantially reflecting pump 141 to gain fiber 146, 150 and 152 to achieve additional gain. Reflector 140 may comprise, for example, an optical filter, a mirror, a fiber Bragg grating (FBG), or any other optical device capable of substantially reflecting one or more pump wavelengths. Coupler 142a and reflector 140 may be replaced by an FBG in the signal path 116 before fiber 146. In some embodiments, reflector 140 may allow additional pumps to be coupled into one or more gain fibers 146, 150, and/or 152.

Figure 2B:
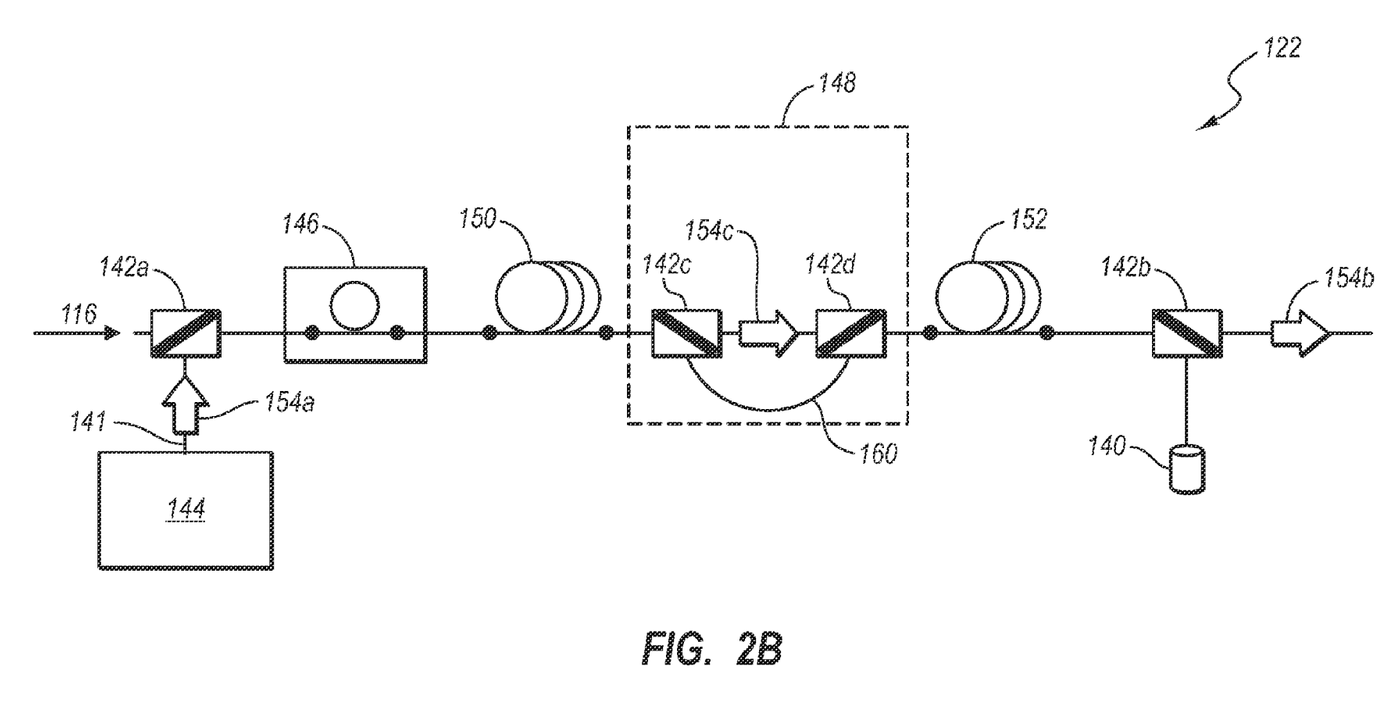

FIG. 2B is another embodiment of amplifier 122. In FIGS. 2A and 2B, like numerals denote like components. In FIG. 2B, pump 144 is coupled into signal path 116 in the co-propagating direction.

Figure 3A:
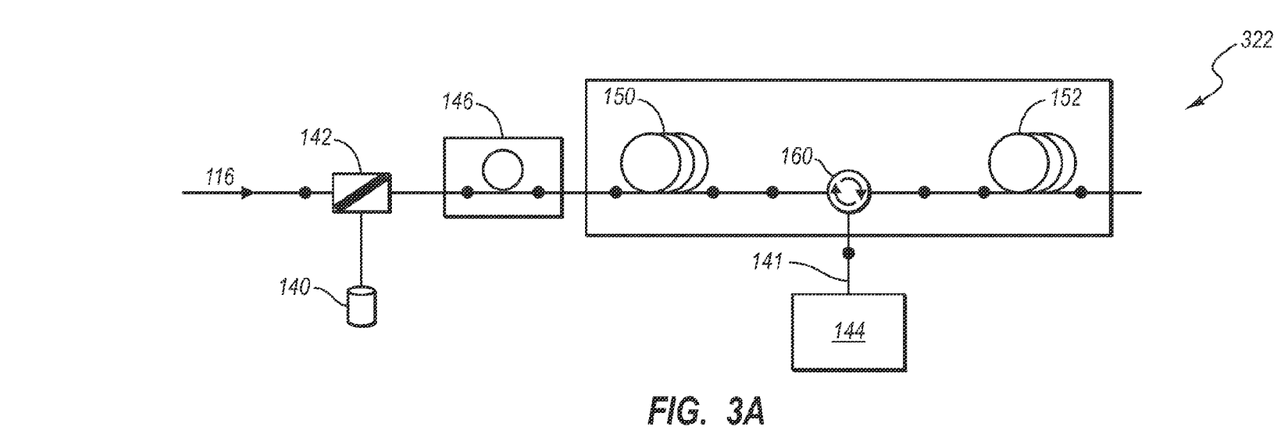
FIGS. 3A-3F are block diagrams of example embodiments of efficient discrete optical amplifiers.

FIG. 3A is a block diagram of one example embodiment of an efficient discrete optical amplifier assembly 322 that implements an optical circulator 160. In this example, amplifier assembly 322 includes a pump source 144 that generates a pump 141 having one or more pump wavelengths. Pump assembly 144 can comprise any device or combination of devices capable of generating one or more pump wavelengths at desired power levels and wavelengths. For example, pump assembly 144 can comprise a solid state laser, such as Nd:YAG or Nd:YLF laser, a semiconductor laser, a laser diode, a cladding pump fiber laser, or any combination of these or other light sources.

Pump 141 can comprise one or more pump wavelengths, each of the one or more pump wavelengths comprising a center wavelength of light. In some embodiments, each of the one or more pump wavelengths within pump 141 can comprise a center wavelength that is substantially different from the center wavelengths of any other pump wavelengths within particular pump 141. Although one pump source 144 and pump 141 are illustrated in this example, any other number of pump sources and/or pumps can be used without departing from the scope of the present disclosure.

In some embodiments, pump 141 can co-propagate through amplifier assembly 322 in relation to one or more optical signals, such as signal 16 described in FIG. 1. In other embodiments, pump 141 can counter-propagate through amplifier assembly 322 in relation to one or more optical signals. In yet other embodiments, at least a portion of pump 141 can co-propagate through amplifier assembly 322 in relation to one or more optical signals, while another portion of pump 141 can counter-propagate through amplifier assembly 322.

Amplifier assembly 322 includes a coupler 142 capable of coupling or decoupling a pump to/from optical signal path 116. In various embodiments, the structure and function of coupler 142 can be substantially similar to the structure and function of coupler 142 in FIGS. 2A and 2B.

Amplifier assembly 322 further includes a reflector 140 capable of substantially reflecting one or more pump wavelengths of pump 141. Reflector 140 may comprise, for example, an optical filter, a mirror, a Bragg grating, or any other optical device capable of substantially reflecting one or more pump wavelengths. In some cases, reflector 140 may allow additional pumps to be coupled into one of the one or more Raman gain mediums 150 and 152 or fiber 146.

In this particular embodiment, amplifier assembly 322 also includes a relatively short length of a rare-earth-doped fiber 146. In some cases, rare-earth-doped fiber can advantageously provide a fixed initial gain over a particular set of wavelengths. Rare-earth-doped fiber 146 can comprise, for example, an erbium-doped or thulium-doped amplifier. In this embodiment, fiber 146 may comprise a 2.0 meters of erbium-doped fiber (OFS, R37105XL). Although fiber 146 comprises a length of 2.0 meters in this example, any other desired length of fiber can be used without departing from the scope of the present disclosure. In another embodiment, doped fiber 146 may comprise 3.7 meters of erbium-doped fiber (OFS, R37003X).

Amplifier assembly 322 can also includes a first Raman gain medium 150 and a second Raman gain medium 152. Although this example includes two Raman gain media 150 and 152, any number of gain media can be used without departing from the scope of the present disclosure. In various embodiments, Raman gain medium 150 could comprise 3.8 km of OFS LLMicroDK fiber. In another embodiment, Raman gain medium 152 could comprise 4.0 km of OFS LLMicroDK fiber. Raman gain media 150 and 152 may provide Raman amplification to an optical signal traversing a communication fiber.

In this example, amplifier assembly 322 also includes an optical circulator 160 that is capable of introducing pump 141 to Raman gain medium 150 in a counter-propagating direction and capable of transmitting reflected pump 141 to Raman gain medium 152 in a co-propagating direction. Optical circulators are typically non-reciprocal devices that redirect light from port to port sequentially in only one direction. In particular, input from port 1 is redirected to port 2. However, a reverse signal entering port 2 totally transmits to port 3 as a usable signal. Ports 1 and 3 are completely isolated. Optical circulators are 3-port coupling devices that are made to be polarization independent and with low insertion loss. Use of circulator 160 can provide better gain control than certain other embodiments. With circulator 160, a higher Raman gain fiber in Raman gain medium 150 can be more efficiently used. Circulator 160 can also create a better noise figure due to gain being higher in Raman gain medium 150 than in FIGS. 2A and 2B. In this example, circulator 160 operates to isolate Raman gain medium 150 from Raman gain medium 152. By isolating the Raman gain media, circulator effectively splits the Raman gain media into two parts and operates to prevent lasing from within the Raman gain media.

The one or more pumps then may travel through multiplexer 142 and to reflector 140, where the one or more pumps may be reflected and sent back through multiplexer 142 and doped fiber 146. The one or more pumps may then travel through Raman gain medium 150, circulator 160, and Raman gain medium 152. The one or more pumps may be used to amplify one or more communication signals traveling through a transmission fiber. Circulator 160 can also provide cost savings by replacing one or more other components in amplifier assembly 322.

In this particular embodiment, pump 141 comprises a pump power of approximately 215 mw at a wavelength of 1442 nm and 365 mW at a wavelength of 1468 nm to support 80 km (loss of 21 dB) standard single mode transmission fiber (SSMF). In operation, pump 141 is received by circulator 160 and is communicated to Raman gain medium 150 in a counter-propagating direction. Pump 141 interacts with optical signal 116 and provides Raman gain to optical signal 116. After traversing gain medium 150, pump contains approximately 33% of its original power.

Pump 141 then traverses rare-earth doped fiber 146, resulting in the amplification of optical signal 116. Pump 141 is then reflected back to signal path 116 by reflector 140 and traverses fiber 146 and Raman gain medium 150 in a co-propagating direction. Circulator 160 receives pump 141 and introduces any residual power from pump 141 into Raman gain medium 152.

In this example, fiber 146 can provide a fixed gain over a particular set of wavelengths due to saturation of the pump absorption. Raman gain media 150 and/or 152 may then provide Raman amplification when pumped with a pump from pump unit 144, which in certain embodiments can be a much larger amplification than provided by rare-earth-doped fiber 146. In certain other embodiments, rare-earth-doped fiber 146 can be connected to circulator 160, or located on either side of Raman gain medium 150 or 152.

One aspect of this disclosure recognizes that implementing circulator 160 in amplifier assembly 322 advantageously reduces the number of optical components required. Compared with the example of FIGS. 2A and 2B, circulator 160 performs the functions of isolator 154a, coupler 142b, and pump bypass filter 148.

This configuration also advantageously allows the pump power of pump 141 to be efficiently used in amplifying optical signal 116.

In another embodiment of FIG. 3A, fiber 146 comprises one of more sections of highly efficient gain fiber such as high-gain Raman fiber capable of providing higher gain per pump power than either Raman gain media 150 or 152. One example of a high-gain Raman fiber is a Raman fiber with a smaller core diameter and/or higher Raman gain coefficient than either Raman gain media 150 or 152. Fiber 146 may comprise a combination of one or more sections of high-gain Raman fiber and one of more rare earth-doped fibers. In another embodiment of FIG. 3A, fiber 146 may comprise a fiber-coupled semiconductor amplifier. In another embodiment of FIG. 3A, fiber 146 may comprise an optical parametric fiber amplifier.

FIGS. 3B to 3F are block diagrams of example embodiments of efficient discrete optical amplifier assemblies that implement optical circulators 160. Amplifier assemblies 422, 522, 622, 722 and 822 are similar in function to amplifier 322 of FIG. 3A. In FIGS. 3A to 3F, like numerals denote like components.

Figure 3B:
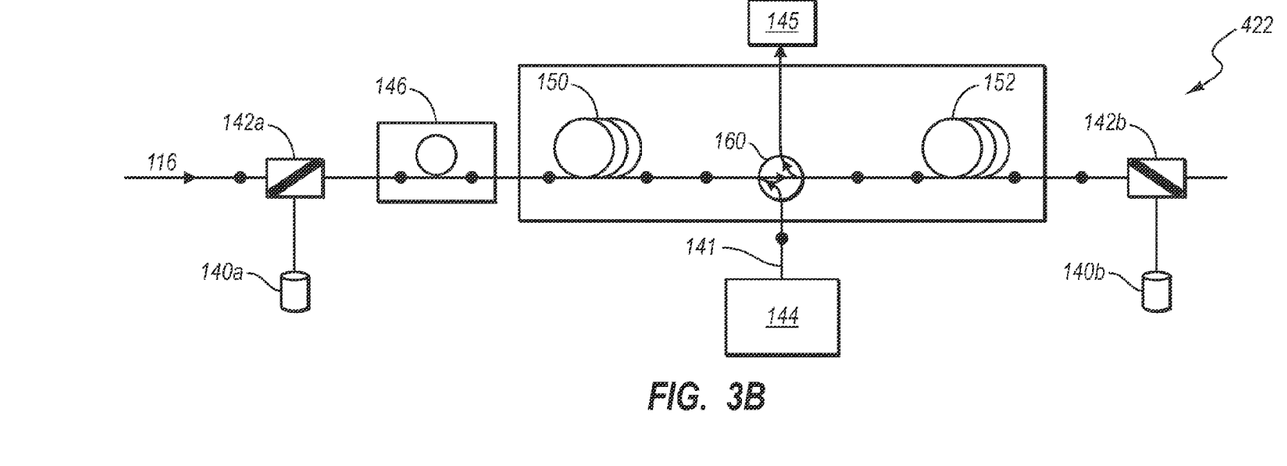

FIG. 3B is a block diagram of an example embodiment of efficient discrete optical amplifier assembly 422 that implements an optical circulator 160. Amplifier assembly 422 comprises a second reflector, reflector 140B, and a second multiplexer 142B. When one or more pumps have traveled through Raman gain medium 152 in the forward direction with respect to signal 116, the one or more pumps may then travel through multiplexer 142B and reflector 140B and be reflected back towards Raman gain medium 152. In another embodiment, circulator 160 is a 4-port optical circulator used to dump the residual pump power to a power dump 145 traveling in the backward direction with respect to signal 116 into port 3 of circulator 160.

Figure 3C:
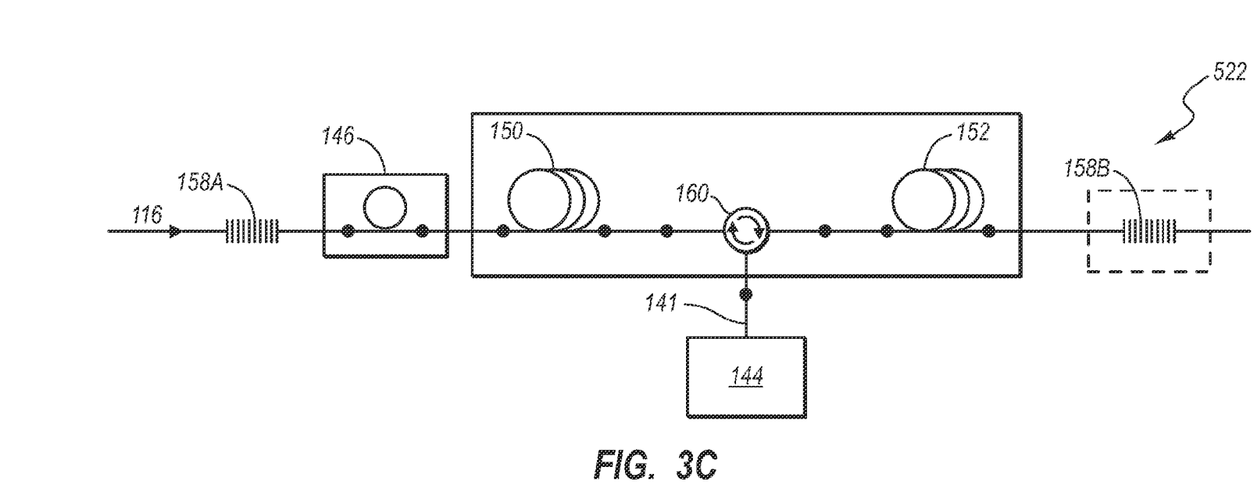

FIG. 3C is a block diagram of an example embodiment of efficient discrete optical amplifier assembly 522 that implement an optical circulator 160. In FIG. 3C, a grating, such as fiber Bragg grating 158A, is used as a pump reflector instead of reflector 140, as in FIG. 3A, for example. Grating 158A can be used to reflect one or more pump wavelengths in amplifier assembly 522. Grating 158A can comprise, as one example, a grating such as TERAXION® C52465-0001, which reflects a wavelength band with a center wavelength of approximately 1471 nm. Amplifier assembly 522 in FIG. 3C may also comprise, in some embodiments, a grating 158B for use as a pump reflector. Grating 158B can operate to reflect one or more pump wavelengths back towards Raman gain medium 152.

Figure 3D:
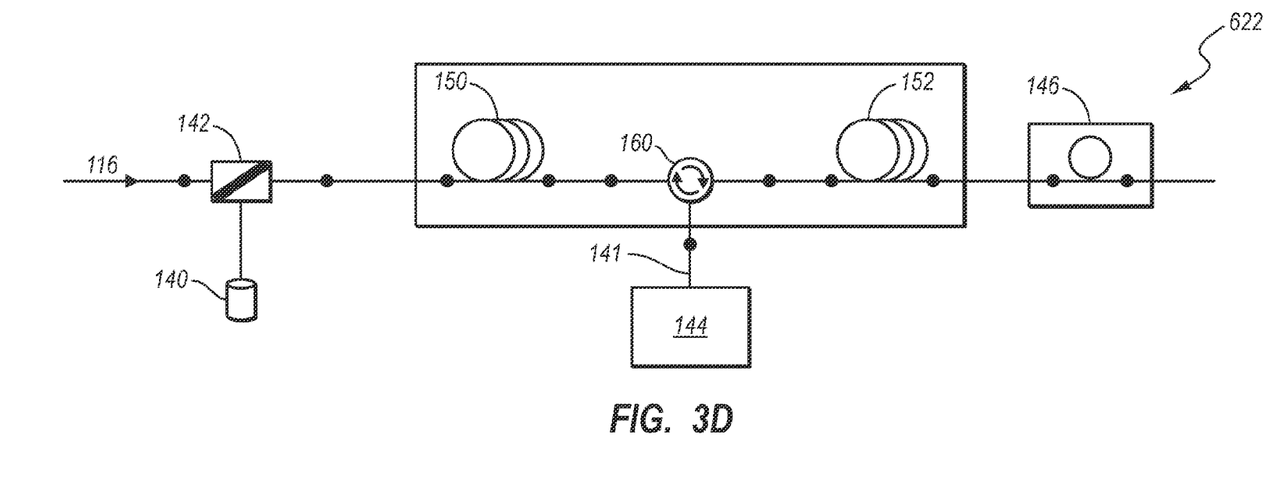

FIG. 3D is a block diagram of an example embodiment of efficient discrete optical amplifier assembly 622 that implement an optical circulator 160. In this embodiment, doped fiber 146 is connected to Raman gain medium 152, instead of Raman gain medium 150, as in some other described embodiments. In FIG. 3D, one or more pumps from pump unit 144 travel a path similar to that described with respect to FIG. 3A. The pumps are reflected off of reflector 140, and then travel through Raman gain medium 150, circulator 160, and Raman gain medium 152. One or more pumps may then travel through doped fiber 146.

Figure 3E:
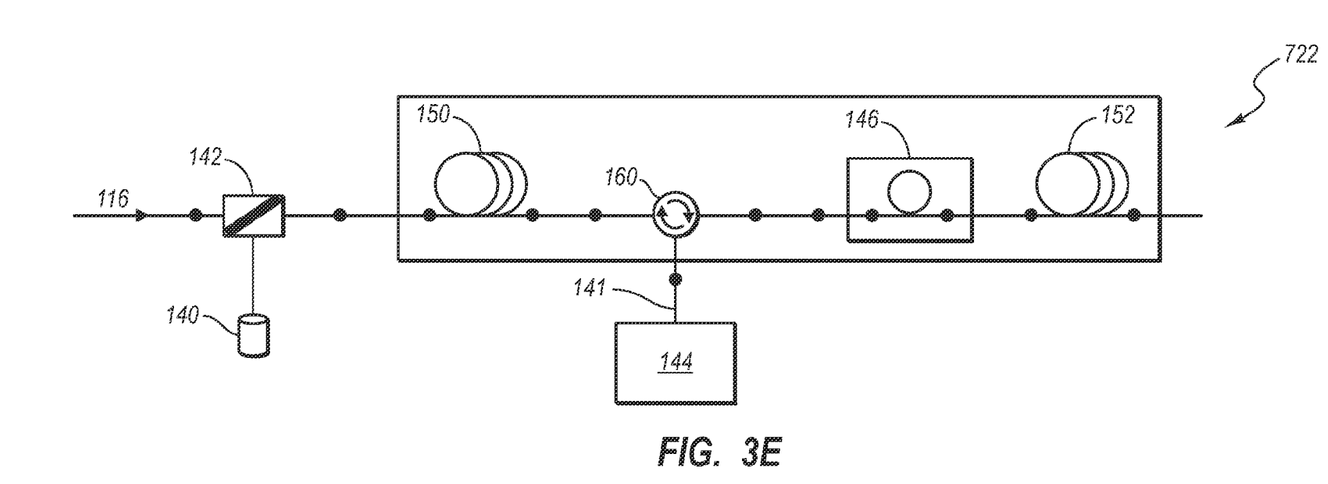

FIG. 3E is a block diagram of an example embodiment of efficient discrete optical amplifier assembly 722 that implement an optical circulator 160. This embodiment is similar in operation to FIG. 3D, but highly efficient gain fiber 146 is connected between circulator 160 and Raman gain medium 152. In other embodiments, one or more Raman gain mediums may reside on either or both sides of highly efficient gain fiber 146. In certain other embodiments, highly efficient gain fiber 146 may be positioned between fiber 150 and circulator 160.

Figure 3F:
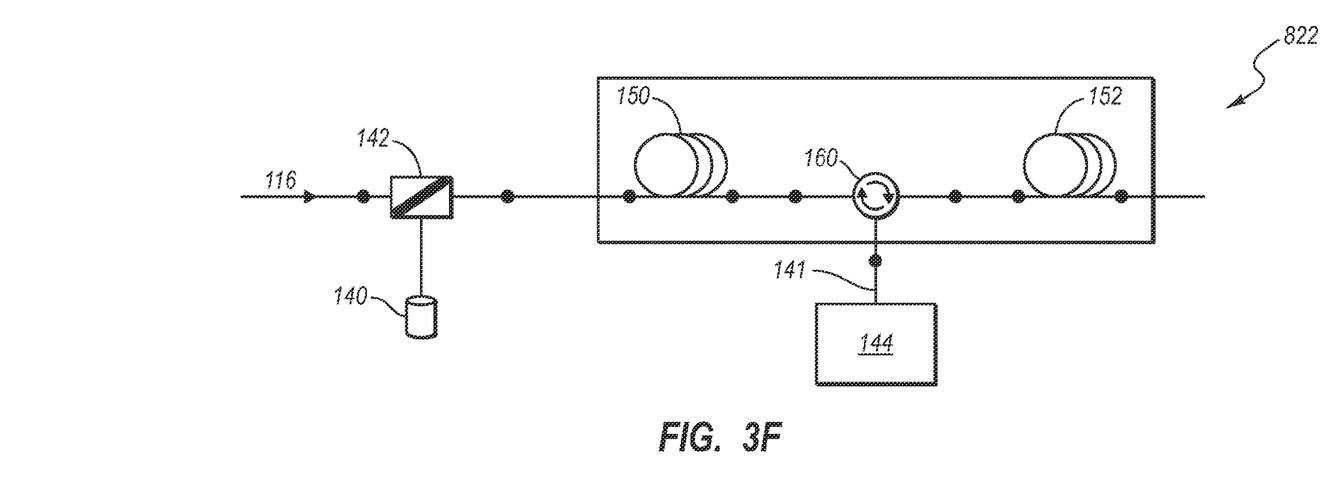

FIG. 3F is a block diagram of an example embodiment of efficient discrete optical amplifier assembly 822 that implement an optical circulator 160. This embodiment lacks a doped fiber 146. One or more pumps travel a similar path as described above with respect to FIG. 3A. One or more pumps from pump unit 144 travel through circulator 160, Raman gain medium 150, and multiplexer 142 and are reflected off of reflector 140. Pumps can then travel back through multiplexer 142, Raman gain medium 150, circulator 160, and Raman gain medium 152.

Figure 4A:
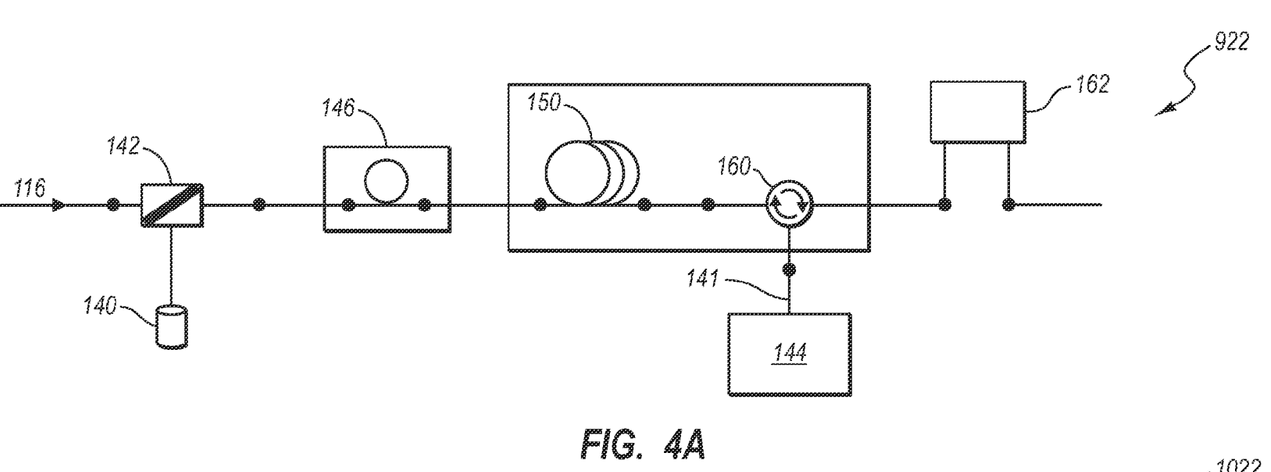
FIGS. 4A-4B are block diagrams of example embodiments of efficient discrete optical amplifiers illustrates another embodiment of a discrete optical amplifier comprising a circulator, a reflector, and a dispersion compensation unit.
Figure 4B:
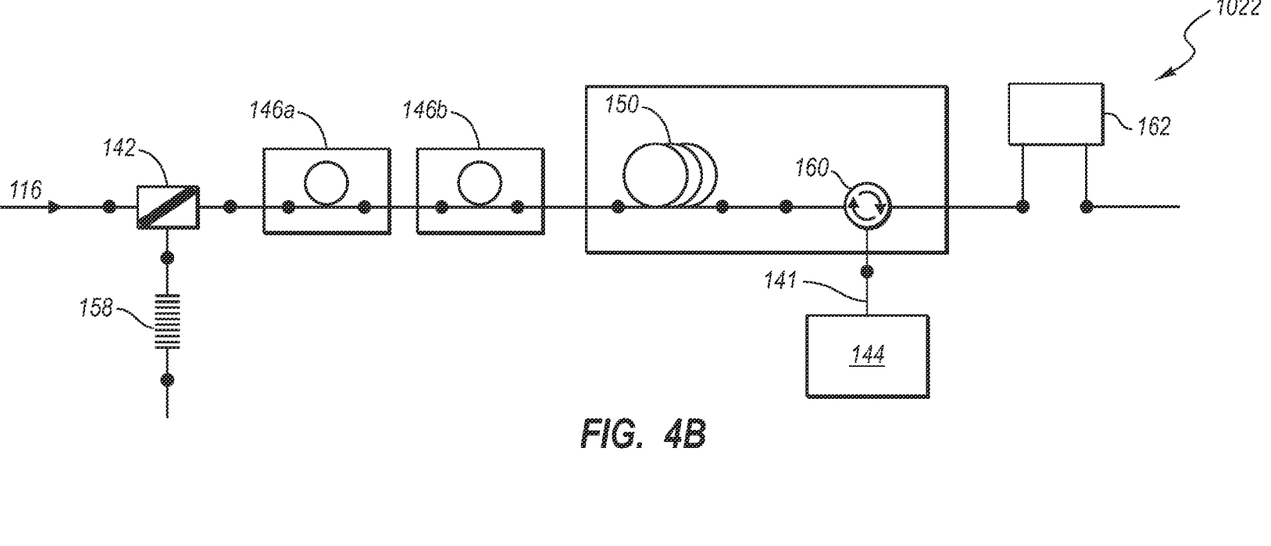

FIG. 4A is a block diagram of an example embodiment of an efficient discrete optical amplifier assembly 922 that implements an optical circulator 160 and a dispersion compensation unit 162. Amplifier assembly 922 is similar in function to amplifier 322 of FIG. 3A. In FIGS. 3A, 4A and 4B, like numerals denote like components. In FIG. 4A, one or more pumps travel a similar path as described above with respect to FIG. 3A. One or more pumps from pump unit 144 travel through circulator 160, Raman gain medium 150, doped fiber 146, and multiplexer 142 and are reflected back by reflector 140. Pumps can then travel back through multiplexer 142, doped fiber 146, Raman gain medium 150, and circulator 160. At this point, residual pump power can be sent to dispersion compensation unit ("DCU") 162. The residual pump power can be used to pump the DCU, lowering the insertion loss by means of Raman amplification. The residual pump power in the DCU may also act to amplify one or more signals traversing the communication fiber.

In various embodiments, the DCU may at least partially compensate for chromatic dispersion associated with one or more signals. In some embodiments, the dispersion compensating element can comprise a dispersion length product that approximately compensates for the dispersion accumulated by one or more optical signals while traversing a communication fiber. In some embodiments, a dispersion compensating fiber can comprise a slope of dispersion that is equal to and opposite from the slope of chromatic dispersion associated with the one or more signals traversing a communication fiber. In this particular embodiment, pump 141 comprises a pump power of approximately 230 mw at a wavelength of 1442 nm and 373 mW at a wavelength of 1468 nm to support 80 km (loss of 21 dB) standard single mode transmission fiber (SSMF).

In some embodiments, assembly 922 may comprise 3.7 meter rare-earth-doped fiber (OFS, R37003X) 146, 3.9 km LLMicroDK in first Raman fiber 150, 3.9 km LLMicroDK in the DCU 162, a pump of 514 mW at 1440 nm and 210 mW at 1471 nm to support 80 km, 21 dB SSMF span.

FIG. 4B is a block diagram of an example embodiment of efficient discrete optical amplifier assembly 1022 that implement an optical circulator 160 and a dispersion compensation unit 162. FIG. 4B operates similarly to FIG. 4A. FIG. 4B comprises a fiber Bragg grating 158, used as a pump reflector instead of reflector 140, as in FIG. 4A, for example. Grating 158 can be used to reflect one or more pump wavelengths in amplifier assembly 1022. Also, in certain embodiments, amplifier assembly 1022 may comprise one or more doped fibers 146, such as doped fibers 146A and 146B. In certain embodiments, doped fiber 146A may comprise 3.5 m erbium-doped fiber R37003X, and doped fiber 146B may comprise 0.7 m of erbium-doped fiber R37105XL.

Figure 5:
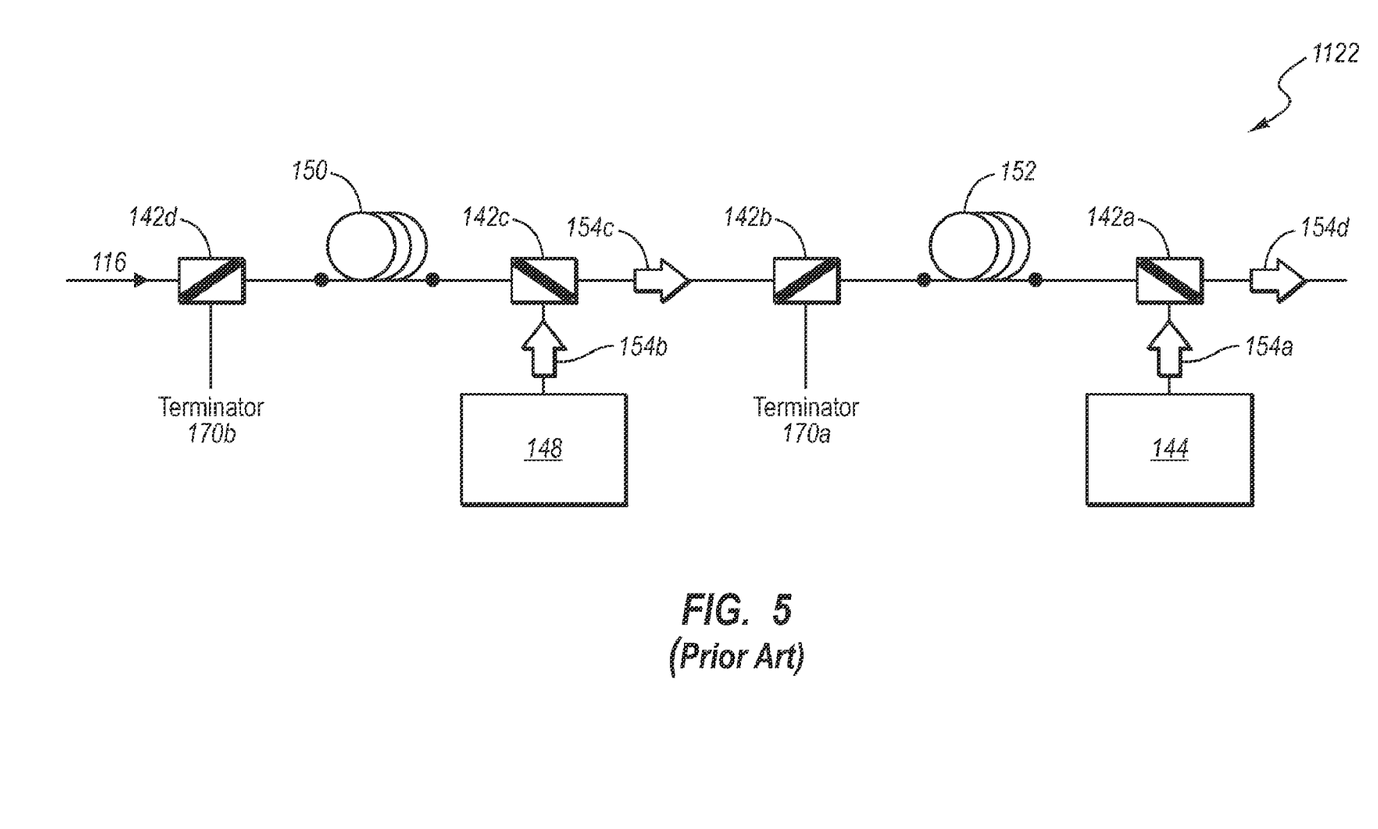
FIG. 5 is a block diagram of a conventional discrete optical amplifier.

FIG. 5 is a block diagram of one example embodiment of a conventional Raman discrete amplifier. In certain embodiments, more than one segment of Raman gain fiber is used to reduce multi-path interference. Gain fiber 150 is pumped by pump source 148 and gain fiber 152 is pumped by pump source 144. Residual pump power is dumped into terminators 170a and/or 170b.

Figure 6:
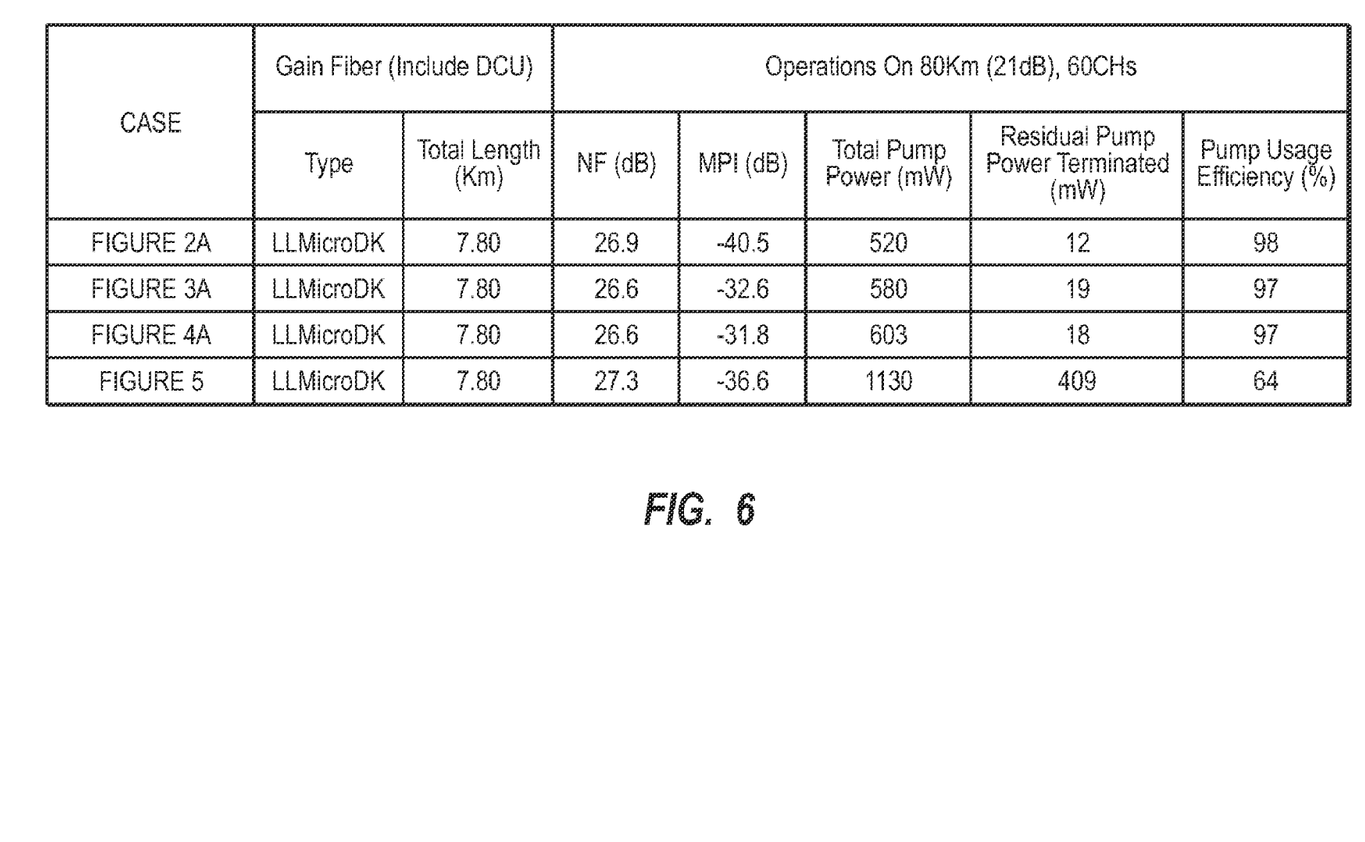
FIG. 6 contains a table of example efficiency and optical performance metrics that demonstrate some of the advantages of the current disclosure.

FIG. 6 shows a table of efficiency and performance metrics of the example efficient amplifiers of FIGS. 2A, 3A, 4A and the conventional amplifier of FIG. 5 under similar operating conditions (80 km SSMF transmission fiber of 21 dB loss with optical signal of 60 channels). It should be noted that (1) the total pump power required for the efficient amplifiers of FIGS. 2A, 3A, and 4A is significantly lower than that of the conventional amplifier of FIG. 5, (2) the residual pump power that is unused (terminated) is less in the efficient amplifiers compared to the conventional amplifiers, (3) the pump usage efficiency is higher in the efficient amplifiers compared to the conventional amplifiers, and (4) the noise figure (NF) is lower in the efficient amplifiers compared to the conventional amplifiers.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An optical amplifier, comprising:
an optical circulator having at least a first port, a second port, and a third port, the optical circulator configured to direct optical wavelengths received at the first port to the second port, and configured to direct optical wavelengths received at the second port to the third port;
a pump source coupled to the first port of the optical circulator and adapted to introduce at least one optical pump to the first port so that the at least one optical pump exits the optical circulator at the second port;
a gain stage having an input and an output and comprising a series combination of a rare-earth-doped fiber amplifier and a Raman amplifier, the rare-earth-doped fiber amplifier being closer to the input of the gain stage, and the Raman amplifier being closer to the output of the gain stage, the output of the gain stage coupled to the second port of the optical circulator so as to receive the at least one optical pump where the at least one optical pump propagates from the output of the gain stage towards the input of the gain stage, wherein the gain stage is further configured to receive an optical signal having a plurality of optical signal wavelengths at the input of the gain stage, the optical signal propagating through the gain stage from the input of the gain stage to the output of the gain stage during which the optical signal is amplified by at least one optical pump prior to the optical signal entering the second port of the optical circulator; and
a pump reflector coupled to the input of the gain stage so as to reflect one or more of the at least one optical pumps back into the gain stage where the one or more reflected optical pumps propagate through the gain stage from the input of the gain stage to the output of the gain stage during which the one or more reflected optical pumps further assist in amplification of the optical signal, wherein the pump reflector is coupled to the input of the gain stage in a manner that allows at least some of the plurality of optical signal wavelengths to pass into the input of the gain stage.

2. The optical amplifier of claim 1, wherein the rare-earth-doped fiber amplifier is an Erbium doped fiber amplifier.

3. The optical amplifier of claim 1, wherein the gain stage is a first gain stage, the optical amplifier further comprising:
a second gain stage having an input and an output, the input of the second gain stage coupled to the third port of the optical circulator to thereby receive the optical signal amplified in the first gain stage as well as a residual portion of the one or more reflected optical pumps, wherein the residual portion of the one or more reflected optical pumps is used to further assist in amplification of the optical signal in the second gain stage.

4. The optical amplifier of claim 3, wherein the second gain stage comprises a Raman amplifier.

5. The optical amplifier of claim 3, wherein an optical path between the third port of the optical circulator and the input of the second gain stage comprises an optical connector.

6. The optical amplifier of claim 1, wherein the rare-earth-doped fiber amplifier has a length of fiber that is approximately 3.7 meters or less.

7. The optical amplifier of claim 1, wherein the rare-earth-doped fiber amplifier has a length of fiber that is approximately 2.1 meters or less.

8. The optical amplifier of claim 1, wherein the plurality of optical signal wavelengths of the optical signal includes wavelengths in both the L-band and the C-band.

9. The optical amplifier of claim 1, further comprising:
a dispersion compensation unit having an input and an output, the input of the dispersion compensation unit coupled to the third port of the optical circulator to thereby receive the optical signal amplified in the gain stage as well as a residual portion of the one or more reflected optical pumps.

10. A method for performing optical amplification, comprising:
causing an optical pump source to introduce at least one optical pump into a first port of an optical circulator, the optical circulator configured to direct the at least one optical pump from the first port of the optical circulator to a second port of the optical circulator;
passing the at least one optical pump from the output of a gain stage coupled to the second port of the optical circulator to an input of the gain stage, while passing an optical signal from the input of the gain stage to the output of the gain stage, thereby causing the at least one optical pump to assist in the amplification of the optical signal in the gain stage prior to the optical signal entering the second port of the circulator, the gain stage comprising a series combination of a rare-earth-doped fiber amplifier and a Raman amplifier, the rare-earth-doped fiber amplifier being closer to the input of the gain stage, and the Raman amplifier being closer to the output of the gain stage; and reflecting, using a pump reflector, one or more of the at least one optical pumps received from the input of the gain stage back into the input of the gain stage where the one or more reflected optical pumps propagate through the gain stage from the input of the gain stage towards the output of the gain stage while further assisting in amplification of the optical signal in the gain stage.

11. The method of claim 10, wherein the rare-earth-doped fiber amplifier is an Erbium doped fiber amplifier.

12. The method of claim 10, wherein the gain stage is a first gain stage, the method further comprising:

after amplification of the optical signal in the first gain stage, passing the optical signal and a residual portion of the one or more reflected optical pumps from the second port of the circulator to a third port of the circulator for introduction into an input of a second gain stage, where the residual portion of the one or more reflected optical pumps is used to further assist in amplification of the optical signal in the second gain stage.

13. The method of claim 12, wherein the second gain stage comprises a Raman amplifier.

14. The method of claim 12, wherein an optical path between the third port of the optical circulator and the input of the second gain stage comprises an optical connector.

15. The method of claim 10, wherein the rare-earth-doped fiber amplifier has a length of fiber that is approximately 3.7 meters or less.

16. The method of claim 10, wherein the rare-earth-doped fiber amplifier has a length of fiber that is approximately 2.1 meters or less.

17. The method of claim 10, wherein the optical signal includes a plurality of optical signal wavelengths including wavelengths in both the L-band and the C-band.

* * * * *